(12) United States Patent
Jimenez Guizar et al.

(10) Patent No.: US 11,736,950 B2
(45) Date of Patent: Aug. 22, 2023

(54) METHOD FOR ALLOCATING RESOURCES FOR A SPREAD-SPECTRUM COMMUNICATION SYSTEM

(71) Applicant: COMMISSARIAT A L'ENERGIE ATOMIQUE ET AUX ENERGIES ALTERNATIVES, Paris (FR)

(72) Inventors: Arturo Jimenez Guizar, Grenoble (FR); Nicolas Deparis, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 108 days.

(21) Appl. No.: 17/174,297

(22) Filed: Feb. 11, 2021

(65) Prior Publication Data
US 2021/0258798 A1 Aug. 19, 2021

(30) Foreign Application Priority Data
Feb. 17, 2020 (FR) ...................................... 2001531

(51) Int. Cl.
*H04W 16/14* (2009.01)
*H04B 17/336* (2015.01)
(Continued)

(52) U.S. Cl.
CPC .............. *H04W 16/14* (2013.01); *H04B 1/69* (2013.01); *H04B 17/336* (2015.01);
(Continued)

(58) Field of Classification Search
CPC ............. H04W 72/0453; H04W 28/26; H04W 72/085; H04W 36/24; H04W 36/14;
(Continued)

(56) References Cited

U.S. PATENT DOCUMENTS

| 2018/0270727 A1* | 9/2018 | Kim | H04W 4/44 |
| 2019/0045543 A1* | 2/2019 | Valls | H04W 74/0808 |
| 2020/0052865 A1* | 2/2020 | Liou | H04W 72/1289 |

OTHER PUBLICATIONS

Haxhibeqiri, et al., "Low Overhead Scheduling of LoRa Transmissions for Improved Scalability", IEEE Internet of Things Journal, vol. 6, No. 2, pp. 3097-3109, Apr. 2019.
(Continued)

*Primary Examiner* — Iqbal Zaidi
(74) *Attorney, Agent, or Firm* — BakerHostetler

(57) ABSTRACT

A method for allocating resources for a spread-spectrum communication system includes a plurality of communicating devices able to communicate with a server via at least one network access gateway, the method comprising the steps of: measuring a quality metric of the communication link for each communicating device over a given time window, determining at least one statistical indicator of the signal-to-interference ratio between each pair of communicating devices based on the quality metric, allocating each communicating device a spreading factor and at least one time slot to communicate, in accordance with a coexistence criterion dependent on the spreading factor and on the statistical indicator of the signal-to-interference ratio, the time resources being organized in the form of super-frames comprising first communication slots wherein several devices are able to communicate simultaneously using different spreading factors and second communication slots wherein several devices are able to communicate sequentially using the same spreading factor, the first communication slots being allocated to the devices that comply with the coexistence criterion, the second communication slots being allocated to the devices that do not comply with the coexistence criterion.

13 Claims, 10 Drawing Sheets

(51) Int. Cl.
  *H04B 1/69* (2011.01)
  *H04W 72/0446* (2023.01)
  *H04W 72/542* (2023.01)
(52) U.S. Cl.
  CPC ..... *H04W 72/0446* (2013.01); *H04W 72/542* (2023.01); *H04B 2001/6912* (2013.01)
(58) Field of Classification Search
  CPC ......... H04L 5/0053; H04L 27/20; H04L 5/02; H04L 5/00; H04B 1/69
  See application file for complete search history.

(56) References Cited

OTHER PUBLICATIONS

Abdelfadeel, et al., "FREE—Fine-grained Scheduling for Reliable and Energy Efficient Data Collection in LoRaWAN", ArXiv abs/1812.05744, 2018.

Croce, et al., "Impact of LoRa Imperfect Orthogonality: Analysis of Link-Level Performance", IEEE Communications Letters, vol. 22, No. 4, Apr. 2018.

Reynders, et al., "Improving Reliability and Scalability of LoRaWANs Through Lightweight Scheduling", IEEE Internet of Things Journal, vol. 5, Issue 3, pp. 1830-1842, Jun. 1, 2018.

Ta, et al., "LoRa-MAB: A Flexible Simulator for Decentralized Learning Resource Allocation in IoT Networks", 2019 12th IFIP Wireless and Mobile Networking Conference, pp. 55-62, Sep. 11, 2019.

Gao, et al., "Towards Energy-Fairness in LoRa Networks", 2019 IEEE 39th International Conference on Distributed Computing Systems (ICDCS), pp. 788-798, Jul. 7, 2019.

Zhou, et al., "A Novel Rate and Channel Control Scheme Based on Data Extraction Rate for LoRa Networks", 2019 IEEE Wireless Communications and Networking Conference (WCNC), Apr. 15, 2019.

Byeon, et al., "PcLoRa: Point-coordinating LoRa with new Channel Structure for massive, reliable and low-latency IoT", 2020 International Conference on Information Networking (ICOIN), pp. 596-601, Jan. 7, 2020.

\* cited by examiner

METHOD FOR ALLOCATING RESOURCES FOR A SPREAD-SPECTRUM COMMUNICATION SYSTEM

CROSS-REFERENCE TO RELATED APPLICATIONS

This application claims priority to foreign French patent application No. FR 2001531, filed on Feb. 17, 2020, the disclosure of which is incorporated by reference in its entirety.

FIELD OF THE INVENTION

The invention relates to the field of spread-spectrum communication systems, in particular systems using a spread spectrum with limited orthogonality properties that may exhibit a non-negligible level of interference with one another.

The invention is applicable notably to communication systems compliant with the Lora™ waveform, or generally to any spread-spectrum system based on frequency scanning modulation or "chirp spread spectrum".

The invention relates to a method for allocating resources for such communication systems, the aim of the method being to take into account a statistical analysis of the metrics linked to the propagation of the signals using different spreading factors within the system.

BACKGROUND

In a spread-spectrum communication system, several users are able to communicate simultaneously using different spreading codes or spreading factors. The frequency and/or time resources may thus be shared without the various signals transmitted simultaneously by various users interfering with one another.

This principle is however satisfied only when the spreading codes that are used are strictly orthogonal to one another, thus making it possible to have a low level of mutual interference.

However, some spread-spectrum techniques use quasi-orthogonal codes that do not exhibit a level of mutual interference that is still compatible with simultaneous communications. This is the case notably for frequency scanning modulation spread-spectrum techniques or "chirp spread spectrum" (CSS). This technology is used notably in the LoRa™ waveform.

CSS spread-spectrum methods are based not on spreading codes, but on spreading factors that correspond to various periods of modulated symbols.

Depending on the level of mutual interference or signal-to-interference ratio between two or more signals modulated with spreading factors, it is not always possible for the signals to coexist.

It is this observation on which the present invention is based, the present invention aiming to propose a novel solution for allocating resources that takes into account the spreading factors and the statistical analysis of metrics characteristic of the signals at reception in order to establish the most optimum allocation strategy.

Documents [1] and [2] describe methods for allocating resources for LoRa™ waveforms for mass communications. The methods proposed in these documents do not take into account the variations in the propagation channel that influence the mutual interference between signals modulated with different spreading factors.

SUMMARY OF THE INVENTION

The present invention proposes a method for allocating radio resources that takes into account a statistical analysis of the propagation of signals modulated with different spreading factors.

The method is based on allocating a super-frame that comprises several successive time slots for each spreading factor. Time slots having a partial temporal overlap are allocated to users exhibiting an acceptable level of mutual interference, whereas sequential time slots are allocated to users likely to interfere with others.

The allocation strategy takes into account an estimate of the signal-to-interference ratio between each pair of signals transmitted by at least two users within the communication system.

The invention makes it possible to adapt the allocation of the radio resources to the variations in the propagation channels and to limit mutual interference between signals. It thus makes it possible to guarantee greater reliability of radio links and to optimize use of the spectrum.

One subject of the invention is a method for allocating resources for a spread-spectrum communication system, comprising a plurality of communicating devices able to communicate with a server via at least one network access gateway, the method comprising the steps of:

Measuring a quality metric of the communication link for each communicating device over a given time window, Determining at least one statistical indicator of the signal-to-interference ratio between each pair of communicating devices based on the quality metric, Allocating each communicating device a spreading factor and at least one time slot to communicate, in accordance with a coexistence criterion dependent on the spreading factor and on the statistical indicator of the signal-to-interference ratio, the time resources being organized in the form of super-frames comprising first communication slots in which several devices are able to communicate simultaneously using different spreading factors and second communication slots in which several devices are able to communicate sequentially using the same spreading factor, the first communication slots being allocated to the devices that comply with the coexistence criterion, the second communication slots being allocated to the devices that do not comply with the coexistence criterion.

According to one variant embodiment, the method comprises the steps of:

Sorting the communicating devices into a list in accordance with the link quality metric, Allocating the first device in the list a first time slot and a first spreading factor, For each other device in the list, allocating the device the first available time slot by running through the super-frame in increasing order of time and spreading factor values for which the device complies with the criterion of coexisting with each of the other devices authorized to communicate in a time slot having a temporal overlap with said first available time slot.

According to one particular aspect of the invention, the communication system implements a spread-spectrum technique with pseudo-orthogonal codes, for example "chirp spread spectrum".

According to one particular aspect of the invention, the link quality metric is a signal-to-noise ratio metric or a received signal power metric.

According to one particular aspect of the invention, the communication system complies with a LoRa™ technology.

According to one particular aspect of the invention, the coexistence criterion is determined by way of steps of:

Calculating a probability of coexistence between two devices by estimating the probability of the signal-to-interference ratio being greater than a first given threshold, based on the statistical indicator, Comparing the probability of coexistence to a second given threshold, Concluding as to the possible coexistence of the two devices if their probability of coexistence is greater than said second threshold.

According to one particular aspect of the invention, the first threshold is a signal-to-interference ratio threshold dependent on the spreading factors of the two devices.

According to one particular aspect of the invention, the at least one statistical indicator of the signal-to-interference ratio is an average and a standard deviation or a variance.

According to one particular aspect of the invention, the statistical distribution of the signal-to-interference ratio follows a normal law and the probability of coexistence is determined by Determining an approximation of the statistical distribution of the signal-to-interference ratio based on the average, the standard deviation and a parameter characteristic of the level of coexistence, Comparing said approximation to the first threshold.

According to one particular aspect of the invention, the average of the signal-to-interference ratio is determined by calculating the difference between the respective averages of the link quality metric of two devices.

According to one particular aspect of the invention, the variance of the signal-to-interference ratio is determined by calculating the sum of the respective variances of the link quality metric of two devices.

In one variant embodiment, the method according to the invention furthermore comprises a step of allocating a frequency channel to each communicating device.

Another subject of the invention is a computer program comprising instructions for executing the method according to the invention when the program is executed by a processor, and a communication system comprising a resource allocation unit configured so as to execute the method for allocating resources according to the invention.

BRIEF DESCRIPTION OF THE DRAWINGS

Other features and advantages of the present invention will become more clearly apparent upon reading the following description with reference to the following appended drawings.

DETAILED DESCRIPTION

The invention is described in the context of the LoRa™ waveform, which uses CSS spreading. Without loss of generality, the invention also applies to other waveforms that implement a spread-spectrum technique using spreading codes that are not perfectly orthogonal.

Figure 1:
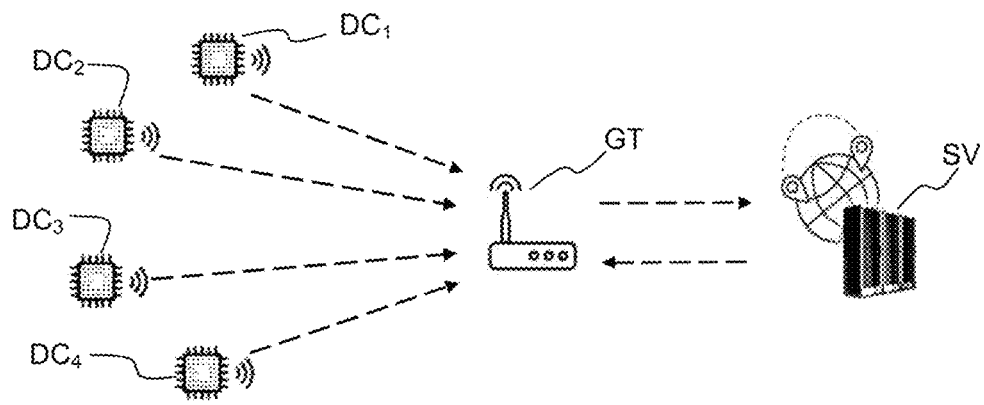
FIG. 1 shows a diagram of a spread-spectrum communication system, for example complying with the Lora™ waveform.

FIG. 1 outlines one example of a communication system to which the invention applies. Several communicating devices DC1, DC2, DC3, DC4 (connected objects, terminals, sensors or the like) establish communication links with a server SV via at least one network access gateway GT.

Each communicating device is configured so as to establish communication using a given spreading factor from among several spreading factors.

The modulation that is used is frequency scanning modulation (chirp spread spectrum, CSS) as specified by the LoRa™ waveform. The principle of CSS is described notably in reference [3].

In summary, this type of spread spectrum uses signals called "chirps" that are frequency-modulated signals with a frequency that varies linearly in the frequency band. Circular time offsets are applied in order to characterize each symbol. The total number of symbols is equal to $2^{SF}$, where SF is the spreading factor. The LoRa waveform typically uses spreading factors of between 6 and 12.

The invention applies notably in the context of what are called mass communications in constricted environments. In other words, the communication system should be capable of managing a very large number of communication links between the server SV and a set of devices. It should be capable of operating in an "indoor" environment, that is to say inside a building, and thus taking into account variations in the propagation channel that is subject to interference notably by the multiple paths of signals resulting from reflections from obstacles.

In this context, one drawback of CSS modulations is that the signals modulated with different spreading factors are not perfectly orthogonal, thereby possibly causing mutual interference depending on the respective powers of the two signals. This phenomenon is explained in document [3].

Figure 2:
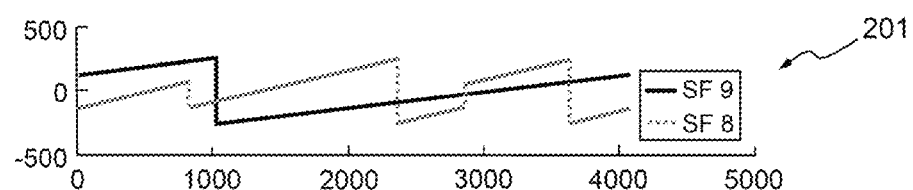
FIG. 2 shows, in several graphs, an illustration of the phenomenon of interference between two signals modulated with different spreading factors.
Figure 2:
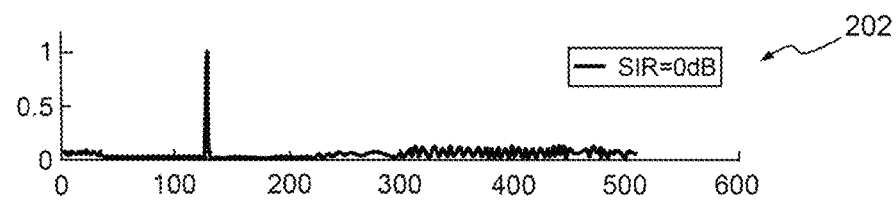
Figure 2:
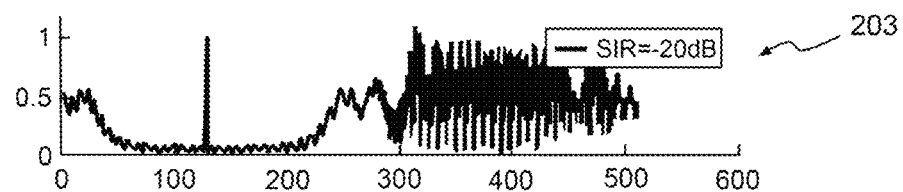

FIG. 2 illustrates, in several graphs, the phenomenon of mutual interference between two signals modulated with two different spreading factors, SF=8 and SF=9 respectively. The graphs in FIG. 2 are taken from prior art document [3].

The graph 201 in FIG. 2 shows two signals respectively modulated with spreading factors SF=8 and SF=9.

The graph 202 in FIG. 2 shows the two signals demodulated at reception when the signal-to-interference ratio between the two signals is 0 dB. In other words, the two signals are received with the same power. The graph 202 is a frequency graph containing a frequency peak P that corresponds to the number of the modulated symbol of the first signal (SF=9). Detecting this frequency peak makes it possible to demodulate the symbol correctly. The interfering signal (SF=8) is seen by the receiver as a CSS waveform, thereby producing, in the frequency domain, a wideband signal with a low spectral density that may be seen on the right of the graph 202 between the abscissas 300 and 500. In the graph 202, it is noted that the interfering signal does not disrupt the detection of the amplitude peak P, and therefore that the two signals are able to coexist without mutual interference.

The graph 203 in FIG. 2 shows the same signals demodulated at reception, but this time with a signal-to-interference ratio equal to −20 dB. In this case, the interfering signal (SF=8) is far stronger than the payload signal (SF=9), thereby causing, after demodulation, a high interference level that no longer makes it possible to detect the amplitude peak P correctly. Specifically, false detections may occur on account of the interference.

It is therefore seen that, depending on the signal-to-interference ratio, two signals modulated with different spreading factors may or may not coexist simultaneously. This phenomenon is described in detail in reference [3]. The invention proposes a method for allocating resources that takes advantage of this particular feature of the quasi-orthogonality of CSS spread spectrum signals.

Figure 3:
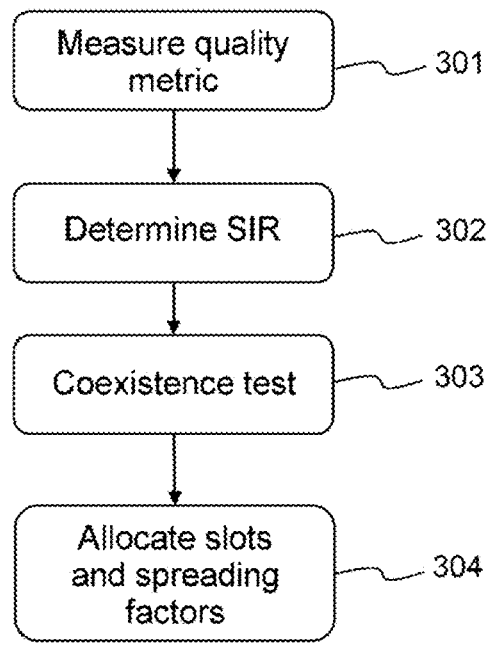
FIG. 3 shows, in a flowchart, the main implementation steps of a method for allocating resources according to the invention in a system of the type described in FIG. 1.

FIG. 3 describes the main steps of the method for allocating resources according to the invention.

Figure 4:
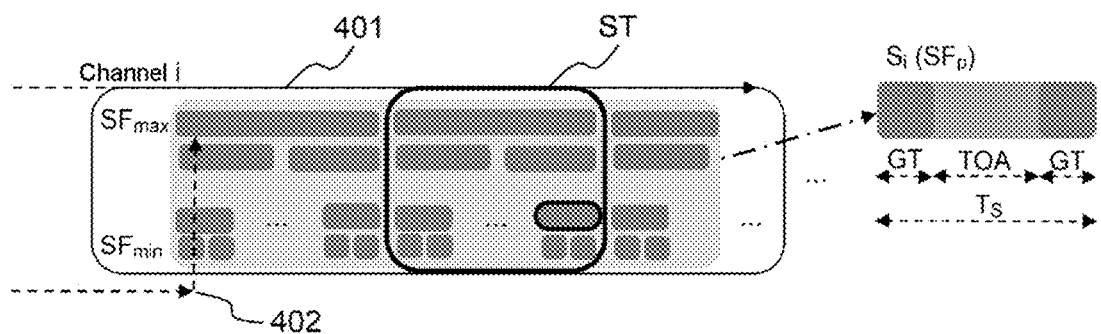
FIG. 4 shows a diagram of a super-frame comprising several time slots allocated to the users of the system using the method for allocating resources according to the invention.

FIG. 4 outlines an example of a super-frame comprising several time slots able to be allocated to users in order to communicate.

A super-frame ST is broken down into time slots $S_i(SF_P)$. For each different spreading factor value $SF_P$, one or more successive time slots are provided in the super-frame. Specifically, the number of slots assigned to each spreading factor value is predefined, since the period of a modulated symbol depends on the spreading factor. The number of slots in a super-frame is divided by two each time the spreading factor is incremented by 1.

For different spreading factor values, the slots that exhibit a temporal overlap are intended to be used simultaneously by various users. In other words, in FIG. 4, the horizontal axis 401 corresponds to time slots allocated successively for one and the same spreading factor value. The vertical axis 402 corresponds to time slots allocated simultaneously to users with different spreading factor values.

The super-frame ST pattern is repeated in terms of time, and may also be repeated in terms of frequency for various frequency channels i.

The principle of the method according to the invention consists in assigning simultaneous time slots to devices that have the best probability of coexistence, whereas sequential time slots are reserved for devices that have a low probability of coexistence.

Probability of coexistence is understood to mean a probability of correctly demodulating each signal transmitted via an allocated time slot, in spite of the potential interference generated by other signals transmitted simultaneously with different spreading factors.

The method according the invention thus consists in:
 Measuring a set of link quality metrics for various communication links using various spreading factors (step 301),
 estimating a statistic for a signal-to-interference ratio between the various links (step 302),
 determining a coexistence test between the various communicating devices within the network (step 303),
 allocating the slots of a super-frame and the associated spreading factors to the devices taking into account their probability of coexistence.

The first step 301 of the method consists in collecting a set of link quality metrics in an initialization phase. During this phase, various devices communicate with the server SV using various spreading factors. Quality metrics of the various communication links are collected (for example at each gateway) and transmitted to the server for analysis. For each device i, a metric vector is obtained over a predetermined time period $l_i=[l_i(t)l_i(t-1)l_i(t-2) \ldots l_i(t-n)]$. The metrics correspond to signal-to-noise ratio measurements or received signal power measurements.

Based on this information, the server SV calculates a vector $L=[[\hat{l}_i\ \sigma_{l,i}]|i=[1 \ldots N_D]$ that contains the average and the variance (or standard deviation) of the link quality metrics for each device i.

This vector is used as input for the following phase of calculating the allocations.

It is sorted in increasing or decreasing order, such that the first element of the vector corresponds to the device that has the best link quality, that is to say the highest signal-to-noise ratio or the highest received signal power.

The allocation method is applied to the sorted vector by successively determining the best allocation for each device of the sorted vector.

The general principle of the invention is as follows. The device that has the best link quality metric receives the first time slot and the first spreading factor value (the lowest value). Next, a coexistence test is applied to the second device by incrementing the value of the spreading factor by 1. If the second device is able to coexist with the first device, it is allocated the first time slot available for the second spreading factor value, and if not it is allocated the second time slot for the first spreading factor value.

The aim of the method is to optimize the coexistence of the devices in order to allocate the simultaneous time slots with different spreading factors as best possible.

The following step 302 consists in estimating a statistical indicator of the signal-to-interference ratio for each pair of devices of the sorted vector L.

To this end, it is considered that the values of the link quality metrics (signal-to-noise ratio or received signal power) are independent random variables that follow a probability distribution with an average $\hat{l}$ and a standard deviation $\sigma$.

The signal-to-interference ratio $SIR_{i,j}$ values are also random variables that follow the same law. In particular, if these variables follow a normal distribution, their average is equal to the difference between the averages of the respective link quality metrics of the devices i and j: $\hat{l}_{i,j}=\hat{l}_i-\hat{l}_j$ and with a standard deviation $\sigma_{i,j}=\sqrt{\sigma_i^2+\sigma_j^2}$. Furthermore, $\hat{l}_{i,j}=-\hat{l}_{j,i}$ and $\sigma_{i,j}=\sigma_{j,i}$.

Figure 5A:
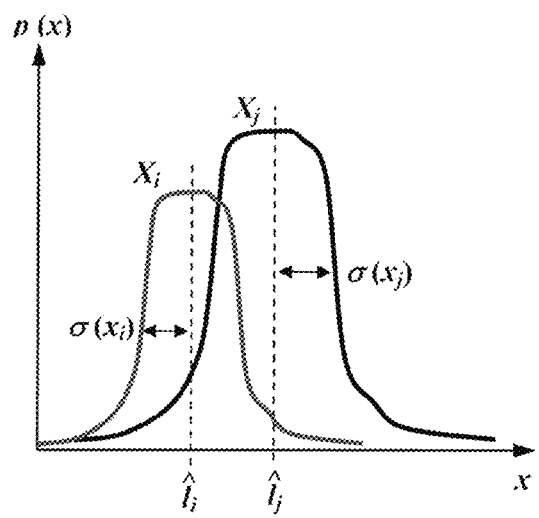
FIG. 5a shows two signal-to-noise ratio distributions in accordance with a normal law.
Figure 5B:
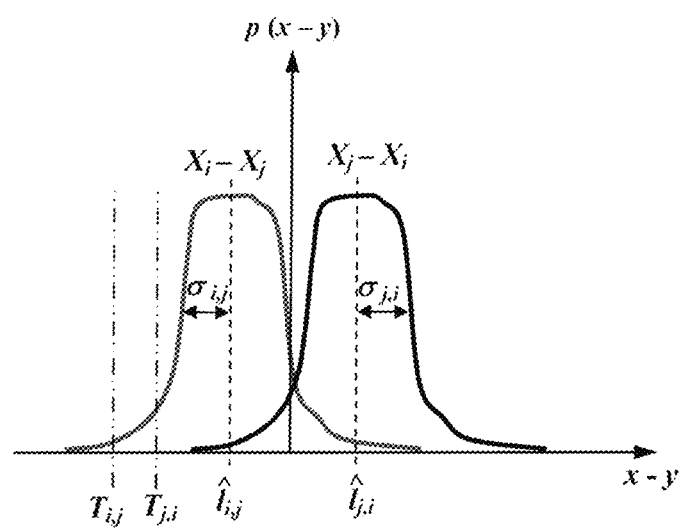
FIG. 5b shows two signal-to-interference ratio distributions obtained from the distributions given in FIG. 5a, FIG. 5c shows a probability of coexistence of two devices as a function of the signal-to-interference ratio between the two communication links established by these two devices with an access gateway to a network.
Figure 5C:
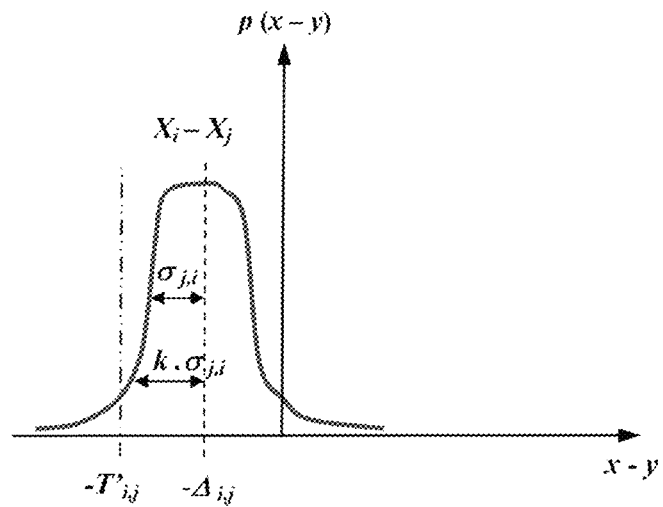

FIGS. 5a, 5b and 5c illustrate the calculation of a probability of coexistence between two devices i and j based on the statistics of the vector L.

FIG. 5a shows the respective distributions of the link quality values $X_i$ and $X_j$ for two devices i and j. These two distributions are characterized by their averages and their standard deviations.

FIG. 5b shows the distributions $X_i-X_j$ and $X_j-X_i$ of the signal-to-interference ratio $SIR_{i,j}$ values defined as the difference between the two distributions given in FIG. 5a.

FIG. 5c shows the probability of coexistence of two devices i and j. The distributions of the variables $SIR_{i,j}$ and $SIR_{j,i}$ are symmetric. The probability of coexistence of the devices i and j may be defined as the probability of one of these distributions exceeding a predefined threshold $T'_{i,j}$.

$$P_{coexistence}(x-y) = \int_{-T'_{i,j}}^{\infty} p(x-\gamma)d(x-y) \qquad (1)$$

The threshold $T'_{i,j}$ is for example defined as $T'_{i,j}$= min($|T_{i,j}|$, $|T_{j,i}|$).

The thresholds $T_{i,j}$ and $T_{j,i}$ depend on the spreading factor SF that is used and correspond to the SIR ratio thresholds below which it is no longer possible to demodulate the payload signal.

The values of $T_{i,j}$ and $T_{j,i}$ are given in reference [3] and listed in the table below.

TABLE 1

| | $SF_{int}$ | | | | | | |
|---|---|---|---|---|---|---|---|
| $SF_{ref}$ | 6 | 7 | 8 | 9 | 10 | 11 | 12 |
| 6 | 0 | −8 | −10 | −11 | −11 | −11 | −11 |
| 7 | −11 | 0 | −11 | −13 | −14 | −14 | −14 |
| 8 | −14 | −13 | 0 | −14 | −16 | −17 | −17 |
| 9 | −17 | −17 | −16 | 0 | −17 | −19 | −20 |
| 10 | −19 | −19 | −19 | −19 | 0 | −20 | −22 |
| 11 | −22 | −22 | −22 | −22 | −22 | 0 | −23 |
| 12 | −24 | −24 | −24 | −25 | −25 | −25 | 0 |

Step 303 of the method according to the invention thus consists in calculating, for each pair of devices (i,j), a probability of coexistence as defined by relationship (1) on the basis of the spreading factor values.

The coexistence test consists in concluding as to the possible coexistence of two devices when the calculated probability exceeds a certain threshold, for example 68%, 95% or 99% depending on the desired tolerance.

In one particular embodiment of the invention, it is assumed that the statistical distributions of the link quality metrics follow a normal law. In this case, the coexistence test 303 is obtained by applying the following relationship:

$$\min(|T_{i,j}|,|T_{j,i}|) > k \cdot \sigma_{i,j} + \Delta_{i,j} \qquad (2)$$

k is a positive real number between 1 and 3 and makes it possible to define the coexistence threshold (68%, 95% or 99%).

The last step 304 of the method consists in allocating the time slots of a super-frame to the devices in the order of the sorted vector L by applying a coexistence test in each step.

The allocation of the slots starts by allocating the lowest spreading factor value and the first time slot to the first device of the sorted vector L.

Next, for each following device in the vector L, it is attempted as a priority to allocate simultaneous time slots to those that have already been allocated, but using a new spreading factor value. To allocate a simultaneous time slot, a coexistence test is performed between the new device and those to which the simultaneous slots with other spreading factor values have been assigned. If the coexistence test is positive, the slot may be allocated to the device, and if not the following time slot is moved to by running through the super-frame in time order.

Figure 6A:
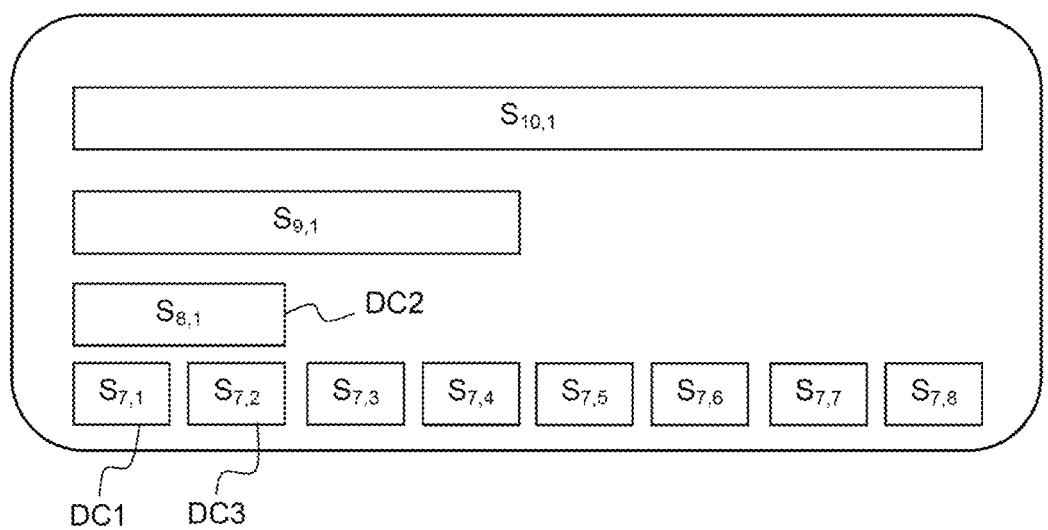
FIG. 6a shows a first example of allocating slots within a super-frame.

FIG. 6a illustrates the mechanism for allocating slots according to the invention for one particular example.

The method starts by allocating the first slot $S_{7,1}$ of the first spreading factor (SF7) to the first device DC1 in the list.

Next, for the second device DC2, it is checked whether it is able to coexist with the first device DC1 via the coexistence test. If this is the case, it is allocated the first time slot $S_{8,1}$ of the second spreading factor (SF8). As may be seen in FIG. 6a, the slots $S_{7,1}$ and $S_{9,1}$ exhibit a temporal overlap of a period equal to that of the slot $S_{7,1}$.

To allocate the third device DC3, it is first of all tested whether it is possible to allocate it the first time slot of the third spreading factor $S_{9,1}$. To this end, a coexistence test is performed between the third device DC3 and each of the two previous devices DC1, DC2, since the slot $S_{9,1}$ exhibits a temporal overlap with both the slot $S_{8,1}$ and the slot $S_{7,1}$.

If DC3 is able to coexist with DC2 but not with DC1, then it is allocated the slot $S_{7,2}$. If DC3 is not able to coexist with either of the two devices DC1, DC2, then it is allocated the slot $S_{7,3}$.

The method continues for each device in the list by always giving first preference to assigning a new available spreading factor and a slot allowing simultaneous communication with other devices.

Figure 6B:
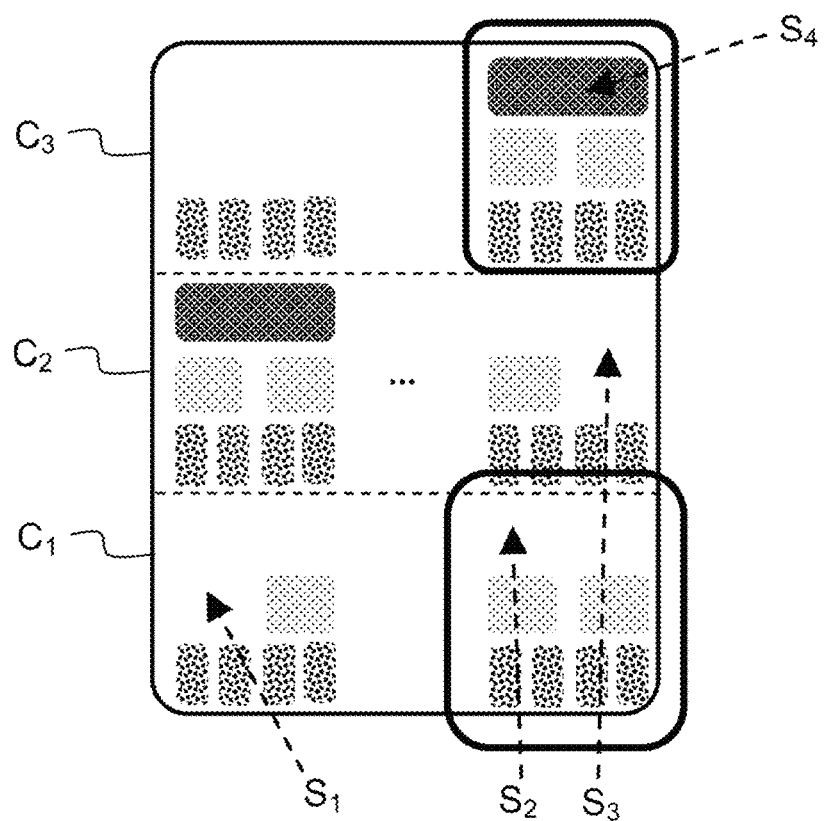
FIG. 6b shows a second example of allocating slots within a super-frame with three channels and three spreading factor values, FIG. 7a schematically shows various phases of a communication protocol using the method for allocating resources according to the invention.

FIG. 6b outlines an example of a super-frame for three separate frequency channels C1, C2, C3.

In this example, the slots S1, S2, S3 have remained free since there was no possible coexistence with the device or devices that use slots simultaneously.

The last device in the list L is assigned to the slot S4 that corresponds to the last time slot with the highest spreading factor.

FIGS. 7a to 7e describe one example of a communication protocol according to the invention.

The communication protocol comprises a first initialization phase, a second resource allocation calculation phase, a third resource allocation information transmission phase and a fourth communication phase.

Figure 7A:
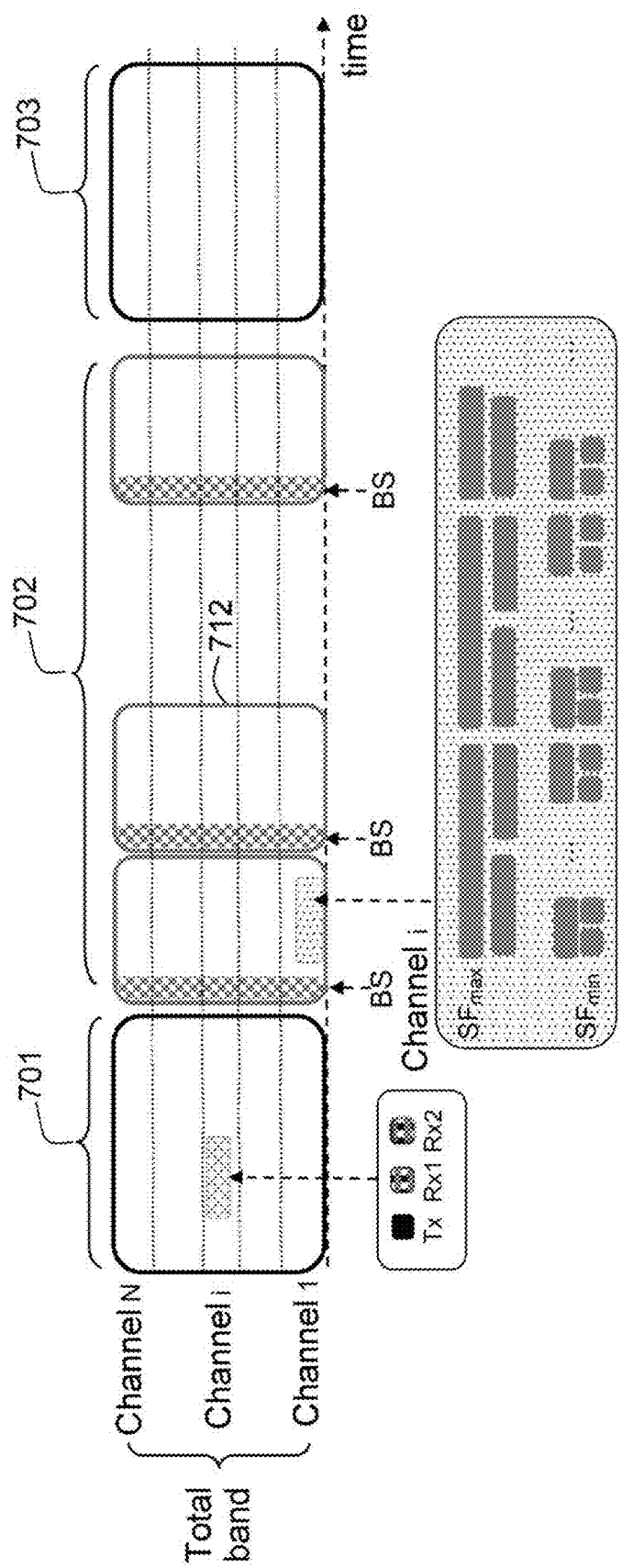
FIG. 7b shows a first initialization phase.
FIG. 7c shows a second allocation calculation phase.
FIG. 7d shows a third phase of transmitting the allocation choices to the nodes of the network.
FIG. 7e shows a fourth communication phase in which the assignment of the spreading factors, slots and channels follows the allocation provided for by the invention.

FIG. 7a outlines a schedule of the time and frequency resources used in each phase. Generally speaking, the total frequency band is subdivided into N channels. In the initialization and resource allocation information transmission phase, the communication resources 701 are organized in the form of random access comprising a transmission slot Tx and two reception slots Rx1, Rx2, in order to exchange information between a communicating device and the server.

In the communication phase, the resources 702 are organized in the form of super-frames, each super-frame 712 comprising a synchronization beacon BS and then a set of time slots organized in the manner described in FIG. 4.

A new initialization and allocation calculation phase 703 may occur periodically or following an event, for example following a significant variation in the propagation conditions of the transmission channel.

Figure 7B:
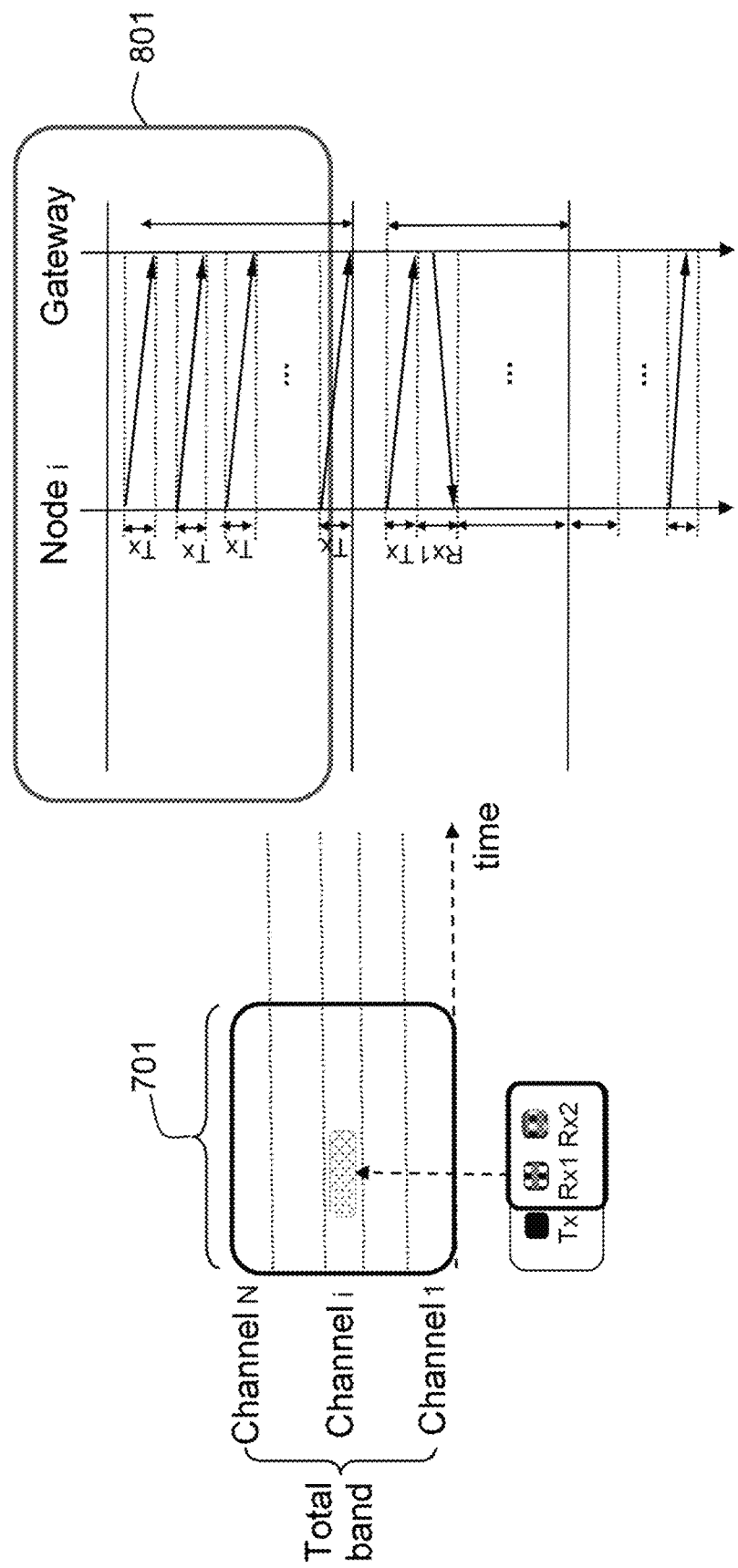

FIG. 7b outlines (on the right of the figure) the first initialization phase 801, which consists in collecting quality metrics of the various communication links. In other words, in this phase, each device DC1, DC2, DC3, DC4 transmits the information $l_i(t)$ to the gateway GT for a predetermined period. The metrics $1(t)$ are transmitted via the slots Tx.

Figure 7C:
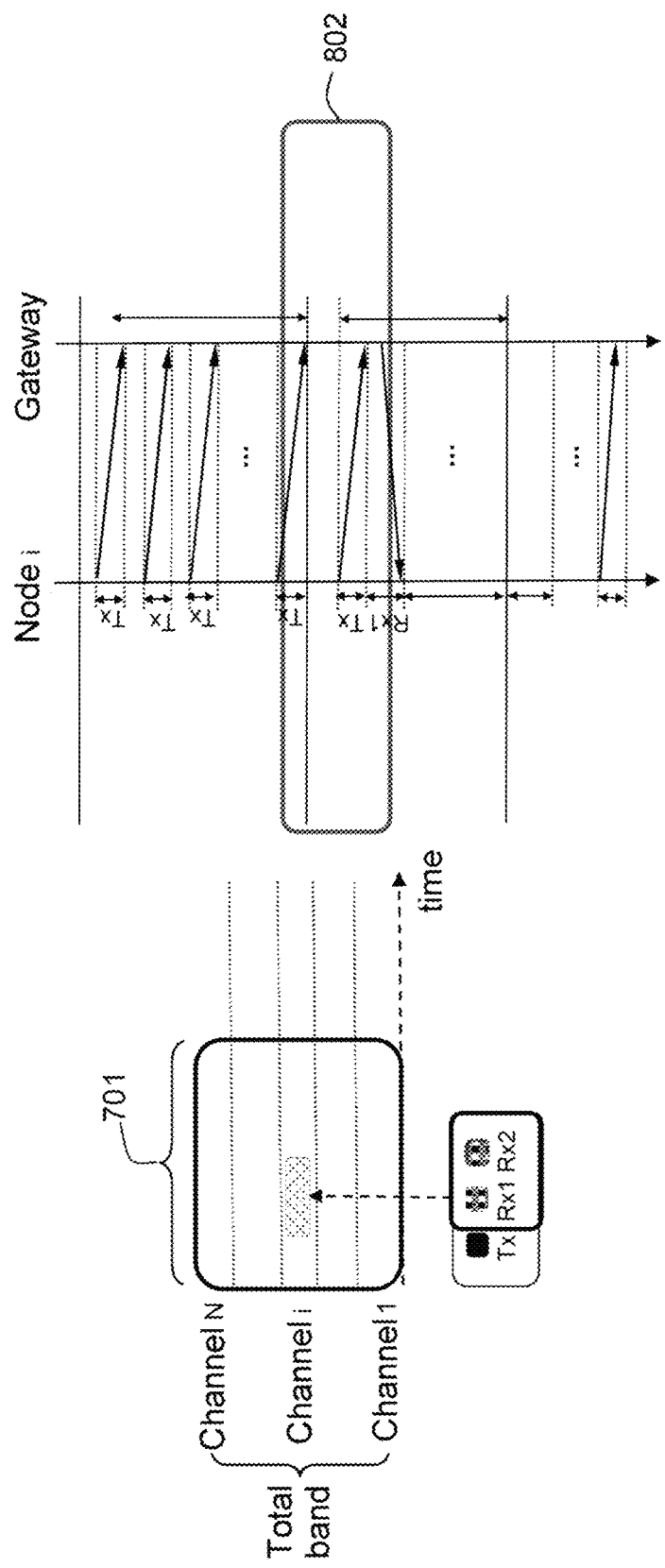

FIG. 7c outlines (on the right of the figure) the second allocation calculation phase 802 performed by the server. This second phase consists in applying the method for allocating resources described in FIG. 3 based on the metrics $1(t)$ collected during the initialization phase 801.

Figure 7D:
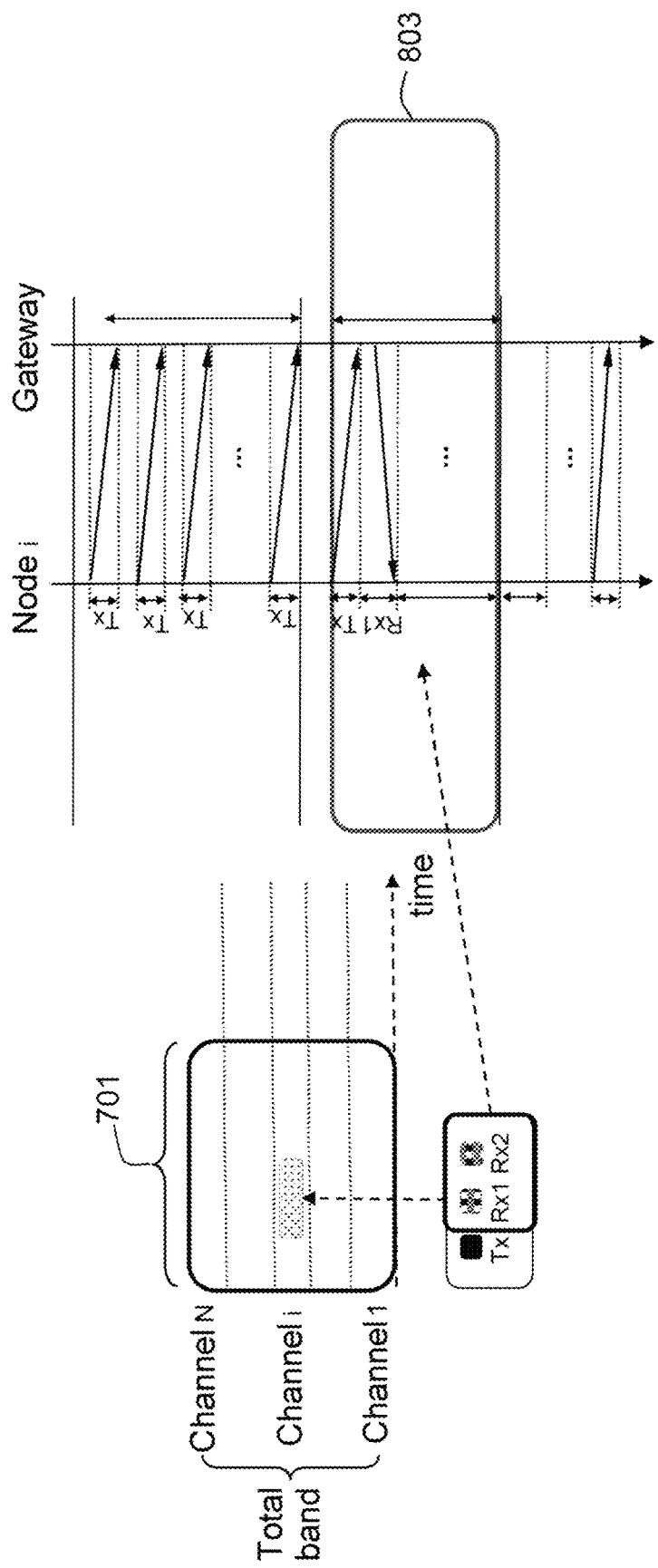

FIG. 7d outlines (on the right of the figure) the third phase 803 of transmitting the calculated allocations to the devices DC1, DC2, DC3, DC4. In this phase, the server SV sends, via the gateway GT, a response message via the slots RX1 or RX2 to each device DC1, DC2, DC3, DC4 in order to communicate to it its transmission parameters, specifically its spreading factor and the time slots in which it is authorized to communicate.

The server waits for the next reception window RX1 or RX2 of each device to send it its allocation parameters.

Figure 7E:
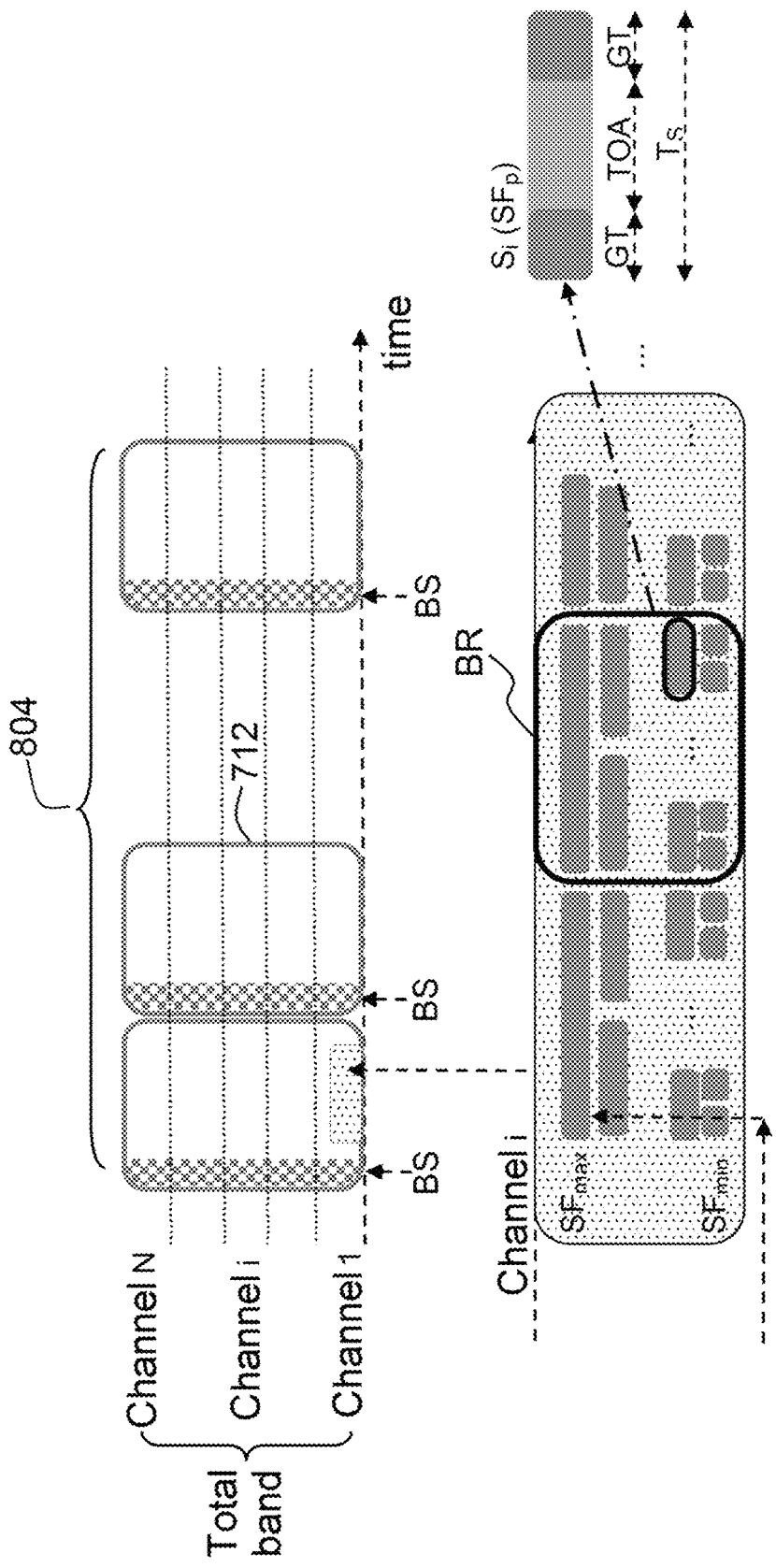

The communicating devices then reconfigure their parameters, and then they switch to a standby mode, waiting for the next synchronization beacon that initializes the fourth communication phase 804 (see FIG. 7e).

In the communication phase 804, the devices communicate with the server following the established allocation strategy. The communication phase is defined by a super-frame 712 that starts with a synchronization beacon BS. Each super-frame consists of several time slots for each spreading factor SF, in order to take advantage of the pseudo-orthogonality of the signals. There may be several super-frames during the communication phase 804.

Slots using the same spreading factor are scheduled sequentially, whereas slots using different spreading factors are scheduled simultaneously so as to form a block of resources BR. The size of a block of resources BR depends on the spreading factor SF. The allocation configuration is used on several independent frequency channels.

Thus, in the communication phase 804, each device wakes up during the time slot that is allocated to it in the super-frame in order to transmit its data in accordance with the sequencing strategy calculated by the server in the calculation phase 802.

Although the invention has been described in the context of a single network gateway GT, the contemplated communication system may comprise several network gateways, each associated with a group of devices.

The invention applies advantageously to communication systems that comply with the LoRa™ waveform, but also applies to any other spread-spectrum system for which the spreading codes that are used are not orthogonal.

REFERENCES

[1] J. Haxhibeqiri, I. Moerman and J. Hoebeke, "Low Overhead Scheduling of LoRa Transmissions for Improved Scalability," in IEEE Internet of Things Journal, vol. 6, no. 2, pp. 3097-3109, April 2019
[2] Abdelfadeel, Khaled Q. et al. "FREE—Fine-grained Scheduling for Reliable and Energy Efficient Data Collection in LoRaWAN.", ArXiv abs/1812.05744, 2018
[3] D. Croce, M. Gucciardo, S. Mangione, G. Santaromita and I. Tinnirello, "Impact of LoRa Imperfect Orthogonality: Analysis of Link-Level Performance," in IEEE Communications Letters, vol. 22, no. 4, pp. 796-799, April 2018

The invention claimed is:

1. A method for allocating resources for a spread-spectrum communication system, comprising a plurality of communicating devices (DC1, DC2, DC3, DC4) able to communicate with a server (SV) via at least one network access gateway (GT), the method comprising:
measuring a quality metric of the communication link for each communicating device over a given time window,
determining at least one statistical indicator of the signal-to-interference ratio between each pair of communicating devices based on the quality metric,
allocating each communicating device a spreading factor and at least one time slot to communicate, in accordance with a coexistence criterion dependent on the spreading factor and on the statistical indicator of the signal-to-interference ratio,
the time resources being organized in the form of super-frames comprising first communication slots wherein several devices are able to communicate simultaneously using different spreading factors and second communication slots wherein several devices are able to communicate sequentially using a single spreading factor,
the first communication slots being allocated to the devices that comply with the coexistence criterion,
the second communication slots being allocated to the devices that do not comply with the coexistence criterion,
wherein the link quality metric is a signal-to-noise ratio metric or a received signal power metric.

2. The method for allocating resources according to claim 1, comprising:
sorting the communicating devices into a list in accordance with the link quality metric,
allocating the first device in the list a first time slot and a first spreading factor,
for each other device in the list, allocating the device the first available time slot by running through the super-frame in increasing order of time and spreading factor values for which the device complies with the criterion of coexisting with each of the other devices authorized to communicate in a time slot having a temporal overlap with said first available time slot.

3. The method for allocating resources according to claim 1, wherein the communication system implements a spread-spectrum technique with pseudo-orthogonal codes, for example "chirp spread spectrum".

4. The method for allocating resources according to claim 1, wherein the communication system complies with a LoRa™ technology.

5. The method for allocating resources according to claim 1, wherein the coexistence criterion is determined by:
calculating a probability of coexistence between two devices by estimating the probability of the signal-to-interference ratio being greater than a first given threshold, based on the statistical indicator, comparing the probability of coexistence to a second given threshold, concluding as to the possible coexistence of the two devices if their probability of coexistence is greater than said second threshold.

6. The method for allocating resources according to claim 5, wherein the first threshold is a signal-to-interference ratio threshold dependent on the spreading factors of the two devices.

7. The method for allocating resources according to claim 5, wherein the at least one statistical indicator of the signal-to-interference ratio is an average and a standard deviation or a variance.

8. The method for allocating resources according to claim 7, wherein the statistical distribution of the signal-to-interference ratio follows a normal law and the probability of coexistence is determined by determining an approximation of the statistical distribution of the signal-to-interference ratio based on the average, the standard deviation and a parameter characteristic of the level of coexistence, comparing said approximation to the first threshold.

9. The method for allocating resources according to claim 7, wherein the average of the signal-to-interference ratio is determined by calculating the difference between the respective averages of the link quality metric of two devices.

10. The method for allocating resources according to claim 7, wherein the variance of the signal-to-interference ratio is determined by calculating the sum of the respective variances of the link quality metric of two devices.

11. The method for allocating resources according to claim 1, further comprising allocating a frequency channel to each communicating device.

12. A non-transitory computer-readable medium storing instructions for executing, by a processor, a method for allocating resources for a spread-spectrum communication system, the spread-spectrum communication system comprising a plurality of communicating devices (DC1, DC2, DC3, DC4) able to communicate with a server (SV) via at least one network access gateway (GT), the method comprising:

measuring a quality metric of the communication link for each communicating device over a given time window;

determining at least one statistical indicator of the signal-to-interference ratio between each pair of communicating devices based on the quality metric; and allocating each communicating device a spreading factor and at least one time slot to communicate, in accordance with a coexistence criterion dependent on the spreading factor and on the statistical indicator of the signal-to-interference ratio, the time resources being organized in the form of superframes comprising first communication slots wherein several devices are able to communicate simultaneously using different spreading factors and second communication slots wherein several devices are able to communicate sequentially using a single spreading factor, the first communication slots being allocated to the devices that comply with the coexistence criterion, the second communication slots being allocated to the devices that do not comply with the coexistence criterion, wherein the link quality metric is a signal-to-noise ratio metric or a received signal power metric.

13. A communication system comprising a resource allocation unit configured so as to execute the method for allocating resources according to claim 1.

* * * * *